[19] United States Patent
Thomas et al.

(10) Patent No.: US 8,762,637 B2
(45) Date of Patent: *Jun. 24, 2014

(54) DATA STORAGE APPARATUS WITH A HDD AND A REMOVABLE SOLID STATE DEVICE

(71) Applicant: Hewlett-Packard Development Company, L.P., Houston, TX (US)

(72) Inventors: Fred Thomas, Fort Collins, CO (US); Walter A. Gaspard, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/965,884

(22) Filed: Aug. 13, 2013

(65) Prior Publication Data

US 2013/0332663 A1 Dec. 12, 2013

Related U.S. Application Data

(63) Continuation of application No. 13/219,306, filed on Aug. 26, 2011, now Pat. No. 8,527,692.

(51) Int. Cl.
*G06F 12/08* (2006.01)

(52) U.S. Cl.
CPC .................................. *G06F 12/0866* (2013.01)
USPC .......................................................... 711/113

(58) Field of Classification Search
CPC ............ G06F 12/0246; G06F 12/0815; G06F 12/0866
See application file for complete search history.

(56) References Cited

U.S. PATENT DOCUMENTS

| | | | |
|---|---|---|---|
| 6,557,077 B1 | 4/2003 | Ghosh et al. | |
| 7,770,077 B2 | 8/2010 | Arimilli et al. | |
| 8,255,630 B1 | 8/2012 | Bali et al. | |
| 8,527,692 B2 * | 9/2013 | Thomas et al. | 711/103 |
| 2006/0230226 A1 | 10/2006 | Meir et al. | |
| 2009/0063895 A1 | 3/2009 | Smith | |
| 2010/0095048 A1 | 4/2010 | Bechtolsheim et al. | |
| 2010/0174860 A1 | 7/2010 | Kim | |
| 2010/0293305 A1 | 11/2010 | Park et al. | |
| 2011/0035540 A1 | 2/2011 | Fitzgerald et al. | |

OTHER PUBLICATIONS

Momentus XT Solid State Hybrid Drives, Aug. 25, 2011. Seagate: Momentus XT 7200 RPM. <http://www.seagate.com/www/en-us/products/laptops/;aptop-hdd>.

* cited by examiner

*Primary Examiner* — Hiep Nguyen

(57) ABSTRACT

According to an example, a data storage apparatus may include a non-volatile primary storage medium, a coupling interface to removably receive a non-volatile solid state device, a communication line connected to the non-volatile primary storage medium and the coupling interface, and a storage controller connected to the communication line. The storage controller may determine a memory type of the non-volatile solid state device, cache a first type of data in the non-volatile solid state device in response to a determination that the non-volatile to solid state device is of a first memory type, and cache a second type of data in the non-volatile solid state device in response to a determination that the non-volatile solid state device is of a second memory type, in which the second type of data differs from the first type of data.

15 Claims, 3 Drawing Sheets

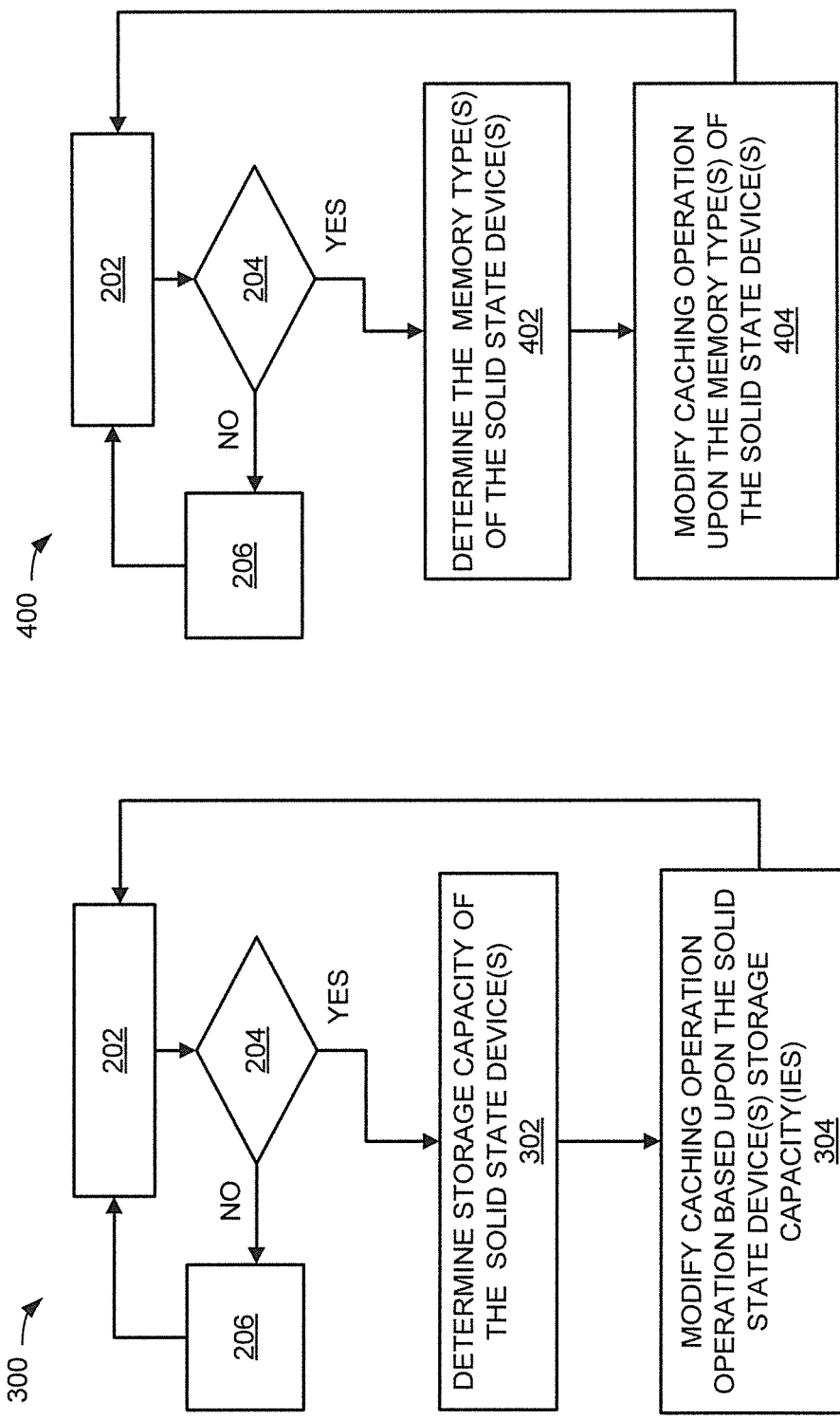

DATA STORAGE APPARATUS WITH A HDD AND A REMOVABLE SOLID STATE DEVICE

CROSS-REFERENCE TO RELATED APPLICATION

This application is a Continuation application of U.S. patent application Ser. No. 13/219,306, filed Aug. 26, 2011, titled "DATA STORAGE APPARATUS WITH A HDD AND A REMOVABLE SOLID STATE DEVICE", the disclosure of which is hereby incorporated by reference in its entirety.

BACKGROUND

The processing speeds of central processing units (CPUs) have increased more rapidly than the access speeds of hard disk drives (HDDs). This difference in speed often contributes to delays in the processing of applications and has also been known to increase power consumption due to increased accesses to the HDDs. One solution is to replace the HDDs with non-volatile solid state drives (SSDs), such as, NAND flash memories. Currently available SSDs are, in many ways, superior to HDDs. For instance, SSDs are typically better suited for devices that require high reliability but also may experience rough environments due to vibration, shock, magnetic fields, etc. Similarly to HDDs, however, SSDs are typically not cost effective to repair or replace because SSDs are often soldered to printed circuit boards (PCBs) and thus, replacement typically requires that the SSD be de-soldered from the PCB followed with soldering of a replacement SSD.

BRIEF DESCRIPTION OF THE DRAWINGS

Features of the present disclosure are illustrated by way of example and not limited in the following figure(s), in which like numerals indicate like elements, in which:

FIGS. 2-4, respectively, depict flow diagrams of methods for operating a data storage apparatus, according to examples of the present disclosure.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are a data storage apparatus and a method of operating a data storage apparatus. The data storage apparatus comprises a hybrid hard disk drive (HDD) because the apparatus includes both a HDD and at least one solid state (SS) device, such as, a solid state drive (SSD), a discreet SS flash memory module, etc. More particularly, the SS devices in the apparatus are to be implemented as a cache and the HDD is to be implemented as a main memory. In addition, the data storage apparatus includes coupling interfaces for the SS devices, such that SS devices, may be removably inserted into the data storage apparatus. Moreover, the data storage apparatus may include additional coupling interfaces to removably receive additional SS devices and thereby increase the memory capacity available for caching. In this regard, the amount of memory capacity available for caching of data may relatively easily be modified.

Also disclosed herein is a storage controller that is to vary caching operations based upon a characteristic of the SS device(s) contained in the data storage apparatus. The characteristic of the SS device(s) may include, for instance, whether the SS device(s) has been provided in the data storage apparatus, the memory type(s) of the SS device(s), the memory capacity of the SS device(s), etc. In one example, the storage controller is to automatically detect whether a SS device(s) has been provided and to vary caching operations based upon whether the SS device(s) has been provided. In another example, the storage controller is to automatically detect a characteristic of the SS device(s), such as, memory capacity, memory type, etc., and to vary caching operations based upon the detected characteristic.

Through implementation of the data storage apparatus and method disclosed herein, the caching functions in a hybrid data storage apparatus may be modified through relatively easy insertion and/or removable of a SS device(s). In addition, the caching functions may substantially be optimized as the types and/or memory capacity of the SS device(s) change.

Figure 1:
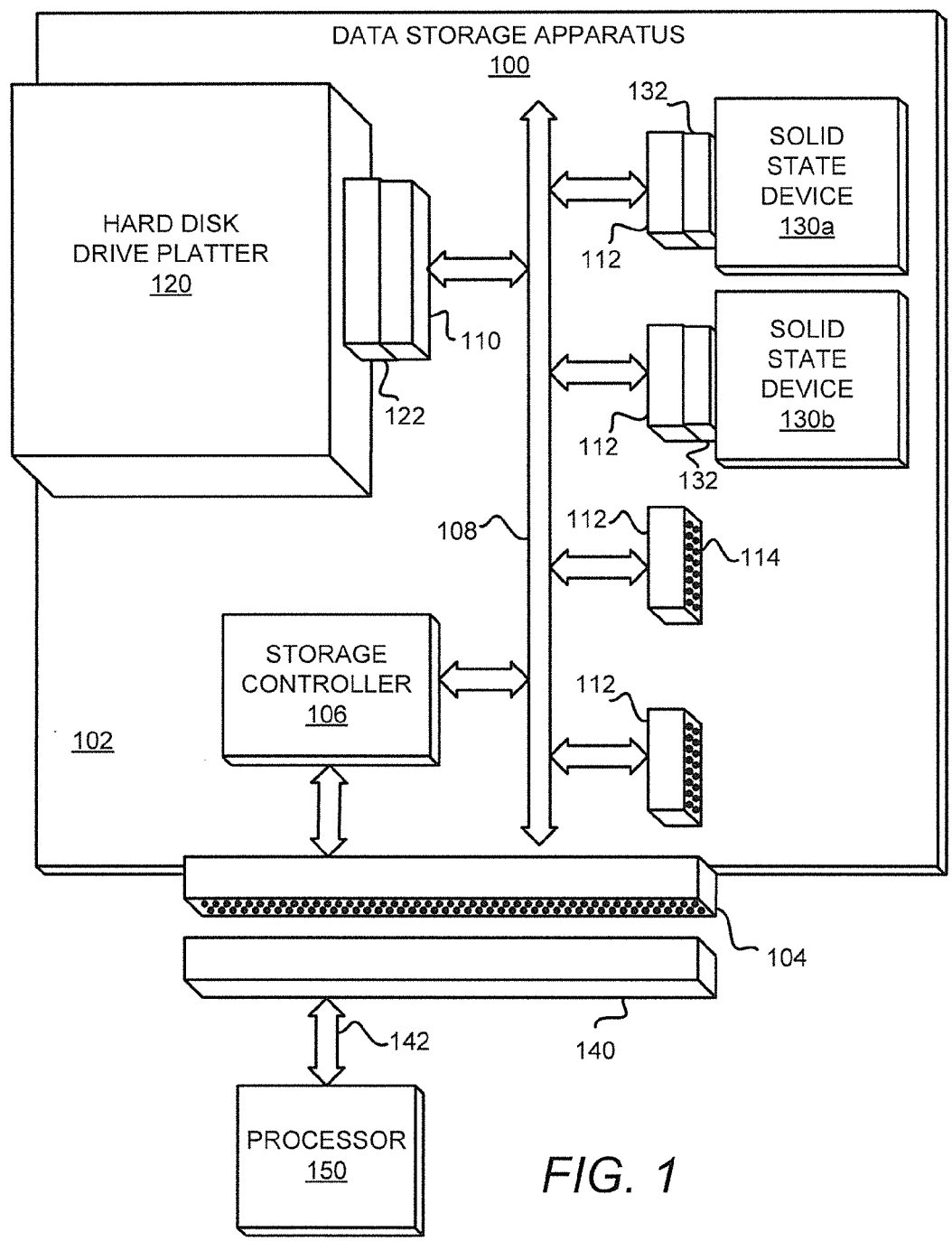
FIG. 1 shows a diagram of a data storage apparatus, according to an example of the present disclosure.

With reference first to FIG. 1, there is shown a diagram of a data storage apparatus 100, according to an example. It should be understood that the data storage apparatus 100 depicted in FIG. 1 may include additional components and that some of the components described herein may be removed and/or modified without departing from a scope of the data storage apparatus 100. It should also be understood that the components depicted in FIG. 1 are not drawn to scale and thus, the components may have different relative sizes with respect to each other than as shown therein.

The data storage apparatus 100 is depicted as including a printed circuit board (PCB) 102, an external interface 104, a storage controller 106, a communication line 108, a first coupling interface 110, and a plurality of second coupling interfaces 112. As also shown in FIG. 1, the external interface 104 is attached to the PCB 102 and is positioned to be coupled with a processor interface 140. The external interface 104 and the processor interface 140 may comprise any of a variety of known types of connectors, such as, Integrated Development Environment (IDE), Advanced Technology Attachment (ATA), Serial Advanced Technology Attachment (SATA), Personal Computer Memory Card International Association (PCMCIA) connectors, Peripheral Component Interconnect (PCI), Peripheral Component Interconnect Express (PCIe), etc. The processing interface 140 is depicted as being in communication with a processor 150 over a bus 142, which is to enable multiple signals, such as, power, address, data, I/O signals, etc., to be communicated between the data storage apparatus 100 and the processor 150. The processor 150 may be a disk drive controller or other external processor. The bus 142 may employ any of a variety of different protocols to connect the processor 150 to the data storage apparatus 100 and the selection of the protocol employed may depend upon the type of drive interface being implemented by the processor 150. Examples of suitable bus 142 protocols include IDE, ATA, SATA, Parallel Advanced Technology Attachment (PATA), Fibre Channel and Small Computer System Interface (SCSI).

The data storage apparatus 100 is also depicted as including a non-volatile HDD platter 120 having a first connector 122 connected to the first coupling interface 110. Although not explicitly shown, the first connector 122 and the first coupling interface 110 may each include corresponding mating connecting elements to enable the HDD platter 120 to be removably connected to the first coupling interface 110. According to another example, the HDD platter 120 is fixedly connected to the first coupling interface 110. In this example, for instance, the first connector 122 of the HDD platter 120 may be soldered or otherwise fixedly attached to the first coupling interface 110.

The data storage apparatus 100 is further depicted as including a plurality of non-volatile SS devices 130a, 130b having respective second connectors 132 connected to respective second coupling interfaces 112. Two of the second coupling interfaces 112 have been depicted as being uncoupled to illustrate that additional SS devices 130c-130n may be added to the data storage apparatus 100. More particularly, the uncoupled second coupling interfaces 112 have been depicted with a plurality of connecting elements 114, for instance, pins or holes, that are to mate with mating connecting elements (not shown) in the second connectors 132 of the SS devices 130a-130n. In this regard, the SS devices 130a-130n may be added and/or removed from the data storage apparatus 100 to thereby vary the total memory capacity of the SS devices 130a-130n. Although the data storage apparatus 100 has been depicted as including one first coupling interface 110 and four second coupling interfaces 112, it should clearly be understood that the data storage apparatus 100 may include any number of interfaces 110, 112.

The first coupling interface 110 and/or the second coupling interfaces 112 may comprise a single connector or multiple, for instance, independent connectors. Examples of suitable connectors include Dual in-line Package (DIP), Single in-line Pin Package (SIPP), Single in-line Memory Module (SIMM), Dual in-line Memory Module (DIMM), Small Outline (SO)-DIMM, Butterfly, IDE, ATA, SATA, etc.

The HDD platter 120 may comprise rotating magnetic or optical media or platters. The SS devices 130a-130n may comprise any of a variety of different types of non-volatile SS devices, such as, NAND-based flash memory, phase-change memory, Memristor, etc. In addition, at least one of the SS devices 130a-130n may comprise a plurality of individual memory devices, such as, 1, 2, or 4 GB memory devices along with control circuitry for controlling operations of the individual memory devices. According to an example, at least one of the SS devices 130a differs from at least another one of the SS devices 130b. Thus, for instance, one of the SS devices 130a may have a 2 GB memory capacity and another one of the SS devices 130b may have a 4 GB memory capacity. As another example, one of the SS devices 130a may be a NAND-based flash memory device and another one of the SS devices 130b may be a phase-change type memory device.

The HDD platter 120 may have any suitable capacity, such as, for instance, 100 GB, 200 GB, and higher. The SS devices 130a-130n may each be, for instance, 1, 2, 4 GB, or more, and the total capacity of the SS devices 130a-130n may be varied by adding SS devices 130a-130n to the data storage apparatus 100 or by removing SS devices 130a-130n from the data storage apparatus 100.

The storage controller 106 is depicted as being fixedly attached to the PCB 102. Alternatively, however, the storage controller 106 may be connected to a coupling interface (not shown) in a manner similar to those discussed above with respect to the HDD disk drive platter 120 and SS devices, 120, 130a-130n. In any regard, the storage controller 106 is depicted as being connected to the external interface 104 and the communication line 108. In addition, the communication line 108 is depicted as being connected to each of the first coupling interface 110 and the second coupling interfaces 112. Generally speaking, the storage controller 106 is to manage operations within the data storage apparatus 100 and to communicate with devices external to the data storage apparatus 100, such as the processor 150. Although not shown in FIG. 1, the data storage apparatus 100 may also include a power conditioning and distribution device that distributes power to the components of the data storage apparatus 100.

The storage controller 106 is to receive data from the processor 150 through the external interface 104 and to manage storage of the data in one or more of the HDD platter 120 and the SS devices 130a-130n over the communication line 108. According to an example, the storage controller 106 is to implement the HDD platter 120 as a primary or main memory and to implement the SS devices 130a-130n as a cache. More particularly, and as discussed in greater detail below, the storage controller 106 is to determine whether a SS device 130a has been connected to a second coupling interface 112 and to implement different types of operations on the HDD platter 120 based upon whether a SS device 130a has been connected to a second coupling interface 112. Thus, for instance, the storage controller 106 may manage the operations of the HDD platter 120 and the SS devices 130a-130n by managing storage of the data in either the HDD platter 120, which may require a relatively longer time to access the data, or at least one of the SS devices 130a-130n to thereby cache the data and enable the data to be retrieved at a relatively shorter period of time.

In addition, or alternatively, for the SS device(s) 130a-130n contained in the data storage apparatus 100, the storage controller 106 is to determine various aspects of the SS device (s) 130a-130n, which include, for instance, type of memory the SS device(s) 130a-130n comprises, the total capacity of the SS device(s) 130a-130n, etc. The storage controller 106 is to implement different types of operations on the HDD platter 120 and the SS device(s) 130a-130n based upon the various aspects of the SS device(s) 130a-130n.

In any regard, the storage controller 106 may communicate with the HDD platter 120 and the SS devices 130a-130n through use of any of a variety of standard communication protocols over the communication line 108. The communication protocols may include, for instance, SATA or other types of mass communication protocols or via more discreet directed storage interfaces such as the Address/Data bus of the storage controller (106). In this interface instantiation, flash memory interface may be the same as an SRAM interface, except that the flash memory requires a 12V/5V programming voltage to erase and write new data. In addition, although the storage controller 106 has been depicted as being in communication with the first and second coupling interfaces 110-112 over a common communication line 108, it should be understood that the storage controller 106 may be individually connected to each of the first and second coupling interfaces 110-112 over discreet communication lines without departing from a scope of the data storage apparatus 100.

The storage controller 106 may comprise hardware or a hardware/software combination. For instance, the storage controller 106 comprises a circuit component containing logic for managing storage of the data in one or more of the HDD platter 120 and the SS devices 130a-130n.

Figure 2:
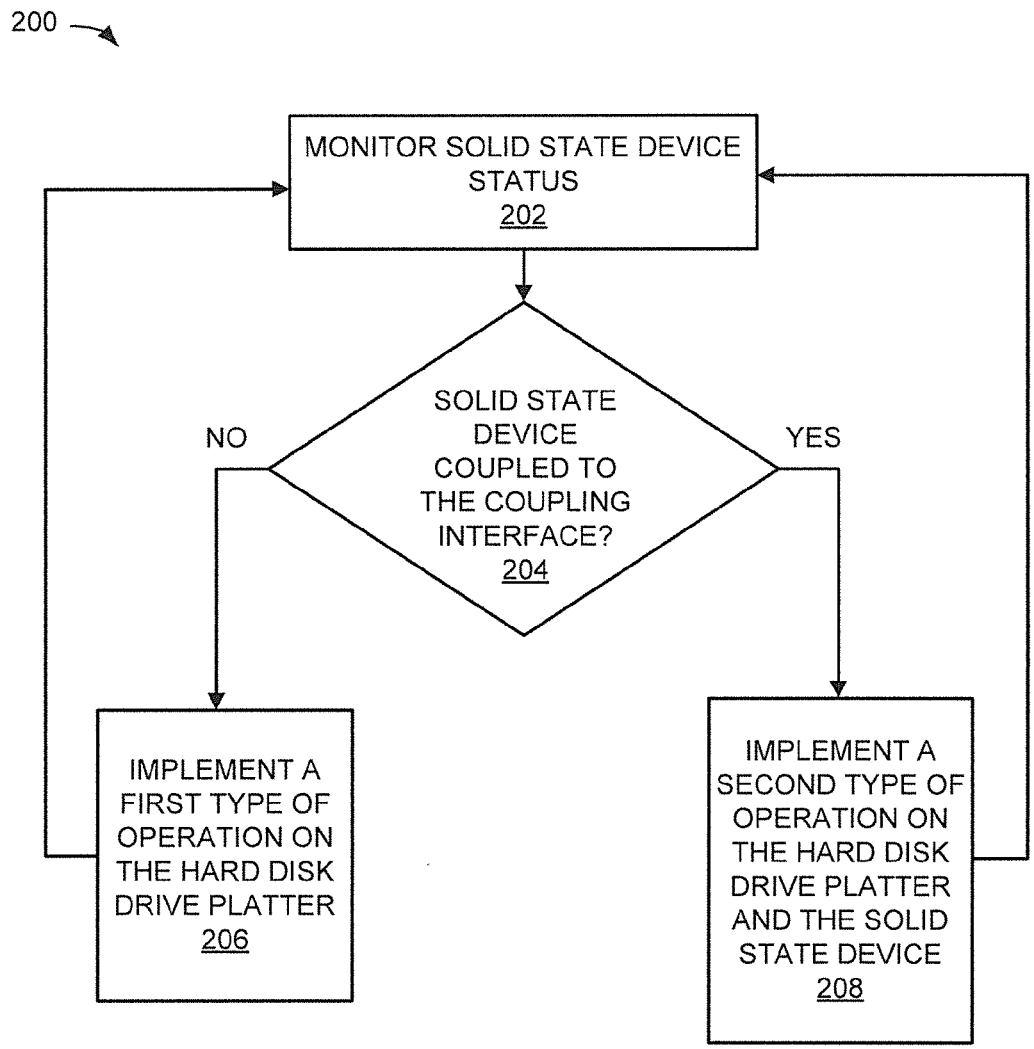

Various manners in which the storage controller 106 may operate are described in greater detail with respect to FIGS. 2-4, which, respectively depict flow diagrams of methods 200-400 for operating a data storage apparatus 100, according to various examples. It should be apparent that the methods 200-400 represent generalized illustrations and that other operations may be added or existing operations may be removed, modified or rearranged without departing from the scopes of the methods 200-400.

The descriptions of the methods 200-400 are made with particular reference to the data storage apparatus 100 depicted in FIG. 1. It should, however, be understood that the methods 200-400 may be implemented in an apparatus that differs from the data storage apparatus 100 without departing from the scopes of the methods 200-400.

With reference first to the method 200, at block 202, a status of a SS device 130a-130n is monitored. More particularly, the storage controller 106 may monitor whether a SS device(s) 130a-130n is connected to or removed from the second coupling interface(s) 112. According to an example, the storage controller 106 automatically determines whether a SS device(s) 130a-130n is connected to the second coupling interface(s) 112. In this example, the storage controller 106 may implement a plug-and-play operation to detect when the SS device(s) 130a-130n is connected to the second coupling interface(s) 112.

In addition, in monitoring the SS device(s) 130a-130n, the storage controller 106 may obtain other information pertaining to the SS device(s) 130a-130n. For instance, the storage controller 106 may determine the memory capacity(ies) of the SS device(s) 130a-130n. In addition, or alternatively, the storage controller 106 may determine the memory types of the SS device(s) 130a-130n.

At block 204, a determination as to whether a SS device(s) 130a-130n is coupled to a second coupling interface 112 is made. As discussed above, the storage controller 106 may automatically determine when and whether a SS device(s) 130a-130n has been coupled to a second coupling interface 112. In addition, the storage controller 106 may automatically determine when and whether a plurality of SS devices 130a-130n have been coupled to a plurality of second coupling interfaces 112.

In response to a determination that a SS device 130a not coupled to a second coupling interface 112, the storage controller 106 implements a first type of operation on the HDD platter 120, as indicated at block 206. The first type of operation may include operating the HDD platter 120 as a main memory without caching received data, such that all of the data received into the data storage apparatus 100 is stored in the HDD platter 120. Alternatively, the first type of operation may include operating a portion of the HDD platter 120 as a cache through use of a conventional caching technique. In this regard, the storage controller 106 may operate the data storage apparatus 100 without any SS devices 130a-130n being installed on the data storage apparatus 100.

In response to a determination that a SS device 130a is coupled to a second coupling interface 112, the storage controller 106 implements a second type of operation on the HDD platter 120 and the SS device 130a, as indicated at block 208. The second type of operation may include an operation that differs from the first type of operation. In addition, the second type of operation may include implementing a caching operation on the SS device(s) 130a-130n. In addition, the storage controller 106 may control operations of the HDD platter 120 and the SS device(s) 130a-130n to substantially optimize implementation of caching operations on the SS device. In other words, for instance, the storage controller 106 may control caching operations to substantially maximize caching of data that is accessed most frequently.

Turning now to the FIG. 3, the method 300 includes many of the same elements as those contained in the method 200. As such, descriptions of the elements having the same reference numerals as those in the method 200 are omitted. As shown in the method 300, following the "yes" condition at block 204, a storage capacity of the SS device(s) 130a-130n is determined, as indicated at block 302. Although the determination of the storage capacity of the SS device(s) 130a-130n has been depicted as occurring after block 204, it should be understood that the storage capacity of the SS device(s) 130a-130n may have been determined at block 202, without departing from a scope of the method 300. In this regard, the storage controller 106 may determine the storage capacity of the SS device(s) 130a-130n as the storage controller 106 is monitoring for the SS device(s) 130a-130n or immediately following detection of the SS device(s) 130a-130n.

At block 304, the caching operation of the second type of operation is modified based upon the determined storage capacity of the SS device(s) 130a-130n. Modification of the caching operation may include, for instance, prioritizing data to be cached based upon the determined storage capacity of the SS device(s) 130a-130n. Thus, for instance, when the storage capacity is relatively small, the storage controller 106 may modify the caching operation to cache only data that has been determined as having the highest priority. In addition, when the storage capacity is relatively large, the storage controller 106 may modify the caching operation to cache additional, lower-priority data.

Following block 304, the storage controller 106 may continue to monitor the SS device(s) 130a-130n to detect whether any changes have occurred and the method 300 may be repeated. As such, the storage controller 106 may modify the caching operation on a substantially continuous basis as the storage capacity of the SS device(s) 130a-130n changes through, for instance, the addition and/or replacement of the SS device(s) 130a-130n.

Turning now to the FIG. 4, the method 400 includes many of the same elements as those contained in the method 200. As such, descriptions of the elements having the same reference numerals as those in the method 200 are omitted. As shown in the method 400, following the "yes" condition at block 204, a memory type(s) of the SS device(s) 130a-130n is determined, as indicated at block 402. Although the determination of the memory type of the SS device(s) 130a-130n has been depicted as occurring after block 204, it should be understood that the memory type of the SS device(s) 130a-130n may have been determined at block 202, without departing from a scope of the method 400. In this regard, the storage controller 106 may determine the memory type(s) of the SS device(s) 130a-130n as the storage controller 106 is monitoring for the SS device(s) 130a-130n or immediately following detection of the SS device(s) 130a-130n.

At block 404, the caching operation of the second type of operation is modified based upon the determined memory type(s) of the SS device(s) 130a-130n. Modification of the caching operation may include, for instance, varying the amount of data to be cached based upon the determined memory type(s) of the SS device(s) 130a-130n. By way of example in which the data storage apparatus 100 includes a SS device 130a that comprises a single-layer cell NAND flash memory and a SS device 130b that comprises a multi-layer cell NAND flash memory, the storage controller 106 may modify the caching operation by caching data having a higher priority level in the SS device 130a comprising the single-layer cell NAND flash memory and caching data having a lower priority level in the SS device 130b comprising the multi-layer cell NAND flash memory. In this regard, the storage controller 106 may discriminately cache data among the plurality of SS devices 130a-130n.

Following block 404, the storage controller 106 may continue to monitor the SS device(s) 130a-130n to detect whether any changes have occurred and the method 400 may be repeated. As such, the storage controller 106 may modify the caching operation on a substantially continuous basis as the storage capacity of the SS device(s) 130a-130n changes through, for instance, the addition and/or replacement of the SS device(s) 130a-130n.

Some or all of the operations set forth in the methods 200-400 may be contained as a utility, program, or subprogram, in any desired computer readable storage medium. In addition, the operations may be embodied by computer programs, which may exist in a variety of forms both active and inactive. For example, they may exist as machine readable instruction(s) comprised of program instructions in source code, object code, executable code or other formats. Any of the above may be embodied on a non-transitory computer readable storage medium, which include storage devices. Thus, for instance, the storage controller 106 may be programmed to implement the methods 200-400.

Examples of non-transitory computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A data storage apparatus comprising:
   a non-volatile primary storage medium;
   a plurality of coupling interfaces to removably receive a plurality of non-volatile solid state devices of differing memory types operable as caches;
   a communication line functionally connected to the non-volatile primary storage medium and the plurality of coupling interfaces; and
   a storage controller connected to the communication line to control operations of the non-volatile primary storage medium and the plurality of non-volatile solid state devices,
   wherein the storage controller is to determine memory types of the plurality of non-volatile solid state devices and cache data in the plurality of non-volatile solid state devices based upon a priority of the data and the memory types of the plurality of non-volatile solid state devices to control caching operations of the non-volatile primary storage medium.

2. The data storage apparatus according to claim 1, wherein the plurality of non-volatile solid state devices are removably coupled to the plurality of coupling interfaces, wherein the storage controller is further to determine storage capacities of the plurality of non-volatile solid state devices, and wherein the storage controller is further to control caching operations in the non-volatile primary storage medium and the plurality of solid state devices based upon the storage capacities of the plurality of solid state devices.

3. The data storage apparatus according to claim 1, wherein the storage controller is further to determine a total storage capacity of the plurality of non-volatile solid state devices and to control caching operations of the non-volatile primary storage medium and the plurality of non-volatile solid state devices based upon the total storage capacity of the plurality of non-volatile solid state devices.

4. The data storage apparatus according to claim 1, wherein the plurality of non-volatile solid state devices comprise a combination of a single-layer cell and a multi-layer cell NAND flash memory.

5. The data storage apparatus according to claim 4, wherein to control caching operations of the non-volatile primary storage medium and the plurality of solid state devices based upon a priority of the data and the memory types of the plurality of solid state devices, the storage controller is to cache data having a higher priority level in a non-volatile solid state device of the plurality of non-volatile solid state devices comprising the single-layer cell NAND flash memory and cache data having a lower priority level in a non-volatile solid state device of the plurality of non-volatile solid state devices comprising the multi-layer cell NAND flash memory.

6. The data storage apparatus according to claim 1, wherein the storage controller is to determine whether the plurality of non-volatile solid state devices are coupled to any of the plurality of coupling interfaces and to disable caching in the data storage apparatus in response to a determination that the plurality of non-volatile solid state devices are not coupled to any of the plurality of coupling interfaces.

7. The data storage apparatus according to claim 1, wherein the storage controller is to control operations of the non-volatile primary storage medium and the plurality of non-volatile solid state devices to substantially optimize implementation of caching operations on the plurality of non-volatile solid state devices.

8. A data storage apparatus comprising:
   a non-volatile primary storage medium;
   a coupling interface to removably receive a non-volatile solid state device;
   a communication line connected to the non-volatile primary storage medium and the coupling interface; and
   a storage controller connected to the communication line, wherein the storage controller is to determine a memory type of the non-volatile solid state device removably coupled to the coupling interface, to cache a first type of data in the non-volatile solid state device in response to a determination that the non-volatile solid state device is of a first memory type, and to cache a second type of data in the non-volatile solid state device in response to a determination that the non-volatile solid state device is of a second memory type, wherein the second type of data differs from the first type of data.

9. The data storage apparatus according to claim 8, wherein the storage controller is further to determine a storage capacity of the non-volatile solid state device and modify at least one of the caching of the first type of data and the second type of data based upon the determined storage capacity of the non-volatile solid state device.

10. A method of operating a data storage apparatus, wherein the data storage apparatus comprises a non-volatile primary storage medium and a coupling interface to removably receive a non-volatile solid state device, said method comprising:

determining a memory type of the non-volatile solid state device removably coupled to the coupling interface;

caching a first type of data in the non-volatile solid state device in response to a determination that the non-volatile solid state device is of a first memory type; and caching a second type of data in the non-volatile solid state device in response to a determination that the non-volatile solid state device is of a second memory type, wherein the second type of data differs from the first type of data.

11. The method according to claim 10, further comprising:

determining a storage capacity of the non-volatile solid state device; and modifying at least one of the caching of the first type of data and the second type of data based upon the determined storage capacity of the non-volatile solid state device.

12. The method according to claim 10, wherein the data storage apparatus comprises a plurality of non-volatile solid state devices comprising a combination of a single-layer cell and a multi-layer cell NAND flash memory, said method further comprising:

determining memory types of the plurality of non-volatile solid state devices; and caching data having a higher priority level in the solid state device comprising the single-layer cell NAND flash memory and caching data having a lower priority level in the solid state device comprising the multi-layer cell NAND flash memory.

13. A non-transitory computer readable storage medium on which is embedded machine readable instructions that when executed by a processor cause the processor to:

determine a memory type of a non-volatile solid state device removably coupled to a coupling interface in a data storage apparatus;

cache a first type of data in the non-volatile solid state device in response to a determination that the non-volatile solid state device is of a first memory type; and cache a second type of data in the non-volatile solid state device in response to a determination that the non-volatile solid state device is of a second memory type, wherein the second type of data differs from the first type of data.

14. The non-transitory computer readable storage medium according to claim 13, wherein the machine readable instructions are further to cause the processor to:

determine a storage capacity of the non-volatile solid state device; and modify at least one of the caching of the first type of data and the second type of data based upon the determined storage capacity of the non-volatile solid state device.

15. The non-transitory computer readable storage medium according to claim 13, wherein the data storage apparatus comprises a plurality of non-volatile solid state devices comprising a combination of a single-layer cell and a multi-layer cell NAND flash memory, and wherein the machine readable instructions are further to cause the processor to:

determine memory types of the plurality of non-volatile solid state devices; and cache data having a higher priority level in the solid state device comprising the single-layer cell NAND flash memory and cache data having a lower priority level in the solid state device comprising the multi-layer cell NAND flash memory.

\* \* \* \* \*